US009825329B2

(12) United States Patent
Han et al.

(10) Patent No.: US 9,825,329 B2
(45) Date of Patent: Nov. 21, 2017

(54) GEL ELECTROLYTE INCLUDING ADDITIVES FOR RECHARGEABLE LITHIUM BATTERY, AND RECHARGEABLE LITHIUM BATTERY INCLUDING SAME

(75) Inventors: Su-Hee Han, Yongin-si (KR); Jin-Sung Kim, Yongin-si (KR); Jin-Hyunk Lim, Yongin-si (KR); Na-Rae Park, Yongin-si (KR); Mi-Hyeun Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1478 days.

(21) Appl. No.: 13/167,635

(22) Filed: Jun. 23, 2011

(65) Prior Publication Data

US 2011/0318645 A1 Dec. 29, 2011

(30) Foreign Application Priority Data

Jun. 25, 2010 (KR) .................. 10-2010-0060747

(51) Int. Cl.
*H01M 10/0565* (2010.01)
*H01M 10/0567* (2010.01)
*H01G 11/56* (2013.01)

(52) U.S. Cl.
CPC ........ *H01M 10/0565* (2013.01); *H01G 11/56* (2013.01); *H01M 10/0567* (2013.01); *H01M 2300/0085* (2013.01); *Y02E 60/13* (2013.01)

(58) Field of Classification Search
None
See application file for complete search history.

(56) References Cited

U.S. PATENT DOCUMENTS 5,558,959 A * 9/1996 Venugopal et al. .......... 429/314
6,838,211 B2 1/2005 Banno et al.
(Continued)

FOREIGN PATENT DOCUMENTS

CN 1528029 A 9/2004
CN 1845372 A 10/2006
(Continued)

OTHER PUBLICATIONS

"Ethylene Carbonate." chemBlink—Online Database of Chemicals from Around the World. Web. Accessed on: Sep. 27, 2013.*
(Continued)

*Primary Examiner* — Rena D Cronin
(74) *Attorney, Agent, or Firm* — Lewis Roca Rothgerber Christie LLP

(57) ABSTRACT

A gel electrolyte for a rechargeable lithium battery includes a gel polymer including a repeating unit derived from a first monomer represented by A-L-E, a non-aqueous organic solvent, a lithium salt, and an additive. A rechargeable lithium battery includes the gel electrolyte. The additive includes a compound selected from compounds represented by

[structure: succinic anhydride with $R^9$, $R^{10}$ substituents]

compounds represented by

[structure: maleic anhydride with $R^{11}$, $R^{12}$ substituents]

derivatives thereof, and combinations thereof.

10 Claims, 1 Drawing Sheet

(56) References Cited

U.S. PATENT DOCUMENTS

| | | | |
|---|---|---|---|
| 7,410,729 | B2 | 8/2008 | Takahashi |
| 7,745,053 | B2 | 6/2010 | Lee et al. |
| 7,998,623 | B2 | 8/2011 | Kim et al. |
| 8,012,630 | B2 | 9/2011 | Yamasaki et al. |
| 2003/0104283 | A1* | 6/2003 | Yamaguchi et al. .......... 429/303 |
| 2003/0190529 | A1* | 10/2003 | Kim et al. .................. 429/307 |
| 2004/0139587 | A1* | 7/2004 | Sato et al. ................. 29/25.03 |
| 2004/0146786 | A1 | 7/2004 | Sato et al. |
| 2006/0228625 | A1 | 10/2006 | Kawashima |
| 2006/0240326 | A1* | 10/2006 | Lee et al. ..................... 429/306 |
| 2007/0009806 | A1* | 1/2007 | Kim ............................. 429/329 |
| 2009/0130555 | A1 | 5/2009 | Ichihashi |
| 2011/0117430 | A1* | 5/2011 | Cheong et al. ............... 429/207 |
| 2011/0117441 | A1 | 5/2011 | Cheong et al. |
| 2011/0143174 | A1* | 6/2011 | Kim et al. .................... 429/50 |

FOREIGN PATENT DOCUMENTS

| | | |
|---|---|---|
| CN | 1855604 A | 11/2006 |
| CN | 101154754 A | 4/2008 |
| JP | 2000-243133 | 9/2000 |
| JP | 2000-311516 A | 11/2000 |
| JP | 2001-123040 A | 5/2001 |
| JP | 2002-033015 A | 1/2002 |
| JP | 2002-033016 A | 1/2002 |
| JP | 2002-033017 A | 1/2002 |
| JP | 2002-270235 A | 9/2002 |
| JP | 2003-257483 A | 9/2003 |
| JP | 2005-108515 A | 4/2005 |
| JP | 2006-108100 A | 4/2006 |
| JP | 2006-302885 A | 11/2006 |
| JP | 2009-123605 | 6/2009 |
| JP | 2011-108619 A | 6/2011 |
| JP | 2011-124203 A | 6/2011 |
| KR | 10-2006-0088950 A | 8/2006 |
| KR | 10-2006-0110635 | 10/2006 |
| KR | 10-2008-0029897 | 4/2008 |
| KR | 10-2008-0087344 A | 10/2008 |
| KR | 10-2008-0088381 A | 10/2008 |
| KR | 10-2008-0109644 A | 12/2008 |
| WO | WO 02/093679 A1 | 11/2002 |

OTHER PUBLICATIONS

"Ethyl Methyl Carbonate." ChemSpider. Royal Society of Chemistry. Web. Accessed on: Sep. 27, 2013.*

"Gamma-Butyrolactone." chemBlink—Online Database of Chemicals from Around the World. Web. Accessed on: Sep. 27, 2013.*

KIPO Notice of Allowance dated Aug. 6, 2012, for Korean priority Patent application 10-2010-0060747, (5 pages).

Chinese Office Action dated Jul. 26, 2013, Issued in Chinese Patent Application No. 201110186448.3, 7 Pages, and English Translation, 8 Pages.

Extended European Search Report dated Oct. 4, 2011, for corresponding EP application 11170044.9, 6 pages.

JPO Office action dated May 21, 2013, for corresponding Japanese Patent application 2011-140885, (3 pages).

Patent Abstracts of Japan, and English machine translation of Japanese Publication 2001-123040 dated May 8, 2001, (14 pages).

Patent Abstracts of Japan, and English machine translation of Japanese Publication 2002-033015 dated Jan. 31, 2002, (14 pages).

Patent Abstracts of Japan, and English machine translation of Japanese Publication 2002-033016 dated Jan. 31, 2002, (17 pages).

Patent Abstracts of Japan, and English machine translation of Japanese Publication 2002-033017, dated Jan. 31, 2002, (17 pages).

Patent Abstracts of Japan, and English machine translation of Japanese Publication 2003-257483, dated Sep. 12, 2003 (14 pages).

KIPO Office action dated Jan. 18, 2012, for Korean priority Patent application 10-2010-0060747, 5 pages.

SIPO Office action dated Jan. 21, 2014, for corresponding Chinese Patent Application No. 201110186448.3, (3 pages), and English Translation, (3 pages).

SIPO Office action dated Jun. 18, 2014, with English translation, for corresponding Chinese Patent application 201110186448.3, (15 pages).

* cited by examiner

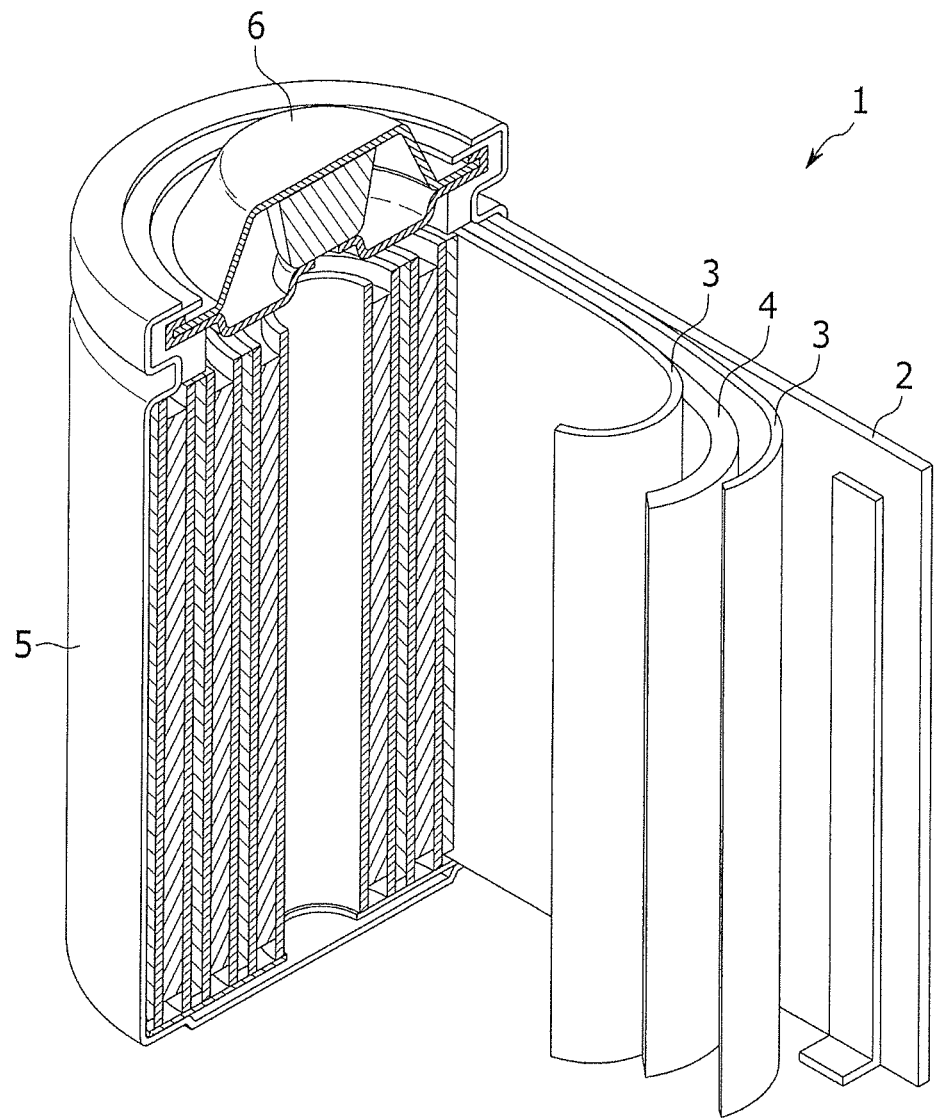

GEL ELECTROLYTE INCLUDING ADDITIVES FOR RECHARGEABLE LITHIUM BATTERY, AND RECHARGEABLE LITHIUM BATTERY INCLUDING SAME

CROSS-REFERENCE TO RELATED APPLICATIONS

This application claims priority to and the benefit of Korean Patent Application No. 10-2010-0060747 filed in the Korean Intellectual Property Office on Jun. 25, 2010, the entire contents of which are incorporated herein by reference.

BACKGROUND

1. Field

This disclosure relates to a gel electrolyte including an additive for a rechargeable lithium battery, and a rechargeable lithium battery including the same.

2. Description of the Related Art

A rechargeable lithium battery is a device that converts chemical energy into electrical energy. The rechargeable lithium battery is widely used as a power source for portable electronic devices such as mobile phones and MP3 players. Particularly, a polymer battery using a gel electrolyte may be easily manufactured into a form suitable for diverse types of portable electronic devices, and its applications are increasingly expanding.

Therefore, improvements in the performance of polymer batteries used in electronic devices, such as cycle-life and high-temperature characteristics, are desired.

SUMMARY

In some embodiments, a gel electrolyte for a rechargeable lithium battery may have an electrode with a reduced non-charging region, and impart improved capacity and cycle-life characteristics to the rechargeable lithium battery.

In other embodiments, a rechargeable lithium battery includes the gel electrolyte for a rechargeable lithium battery.

According to some embodiments, a gel electrolyte for a rechargeable lithium battery includes a gel polymer, a non-aqueous organic solvent, a lithium salt, and an additive.

The gel polymer may include a repeating unit derived from a first monomer represented by the following Chemical Formula 1.

A-L-E   Chemical Formula 1

In Chemical Formula 1, L is a residual group of polyester polyol, and A and E may be the same or different and are independently selected from moieties represented by the following Chemical Formulae 2 to 9.

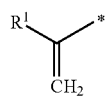

Chemical Formula 2

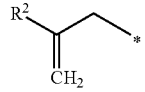

Chemical Formula 3

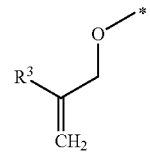

Chemical Formula 4

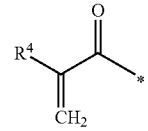

Chemical Formula 5

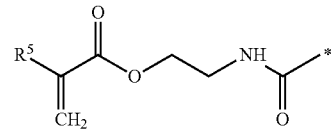

Chemical Formula 6

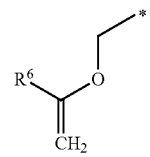

Chemical Formula 7

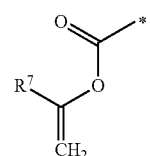

Chemical Formula 8

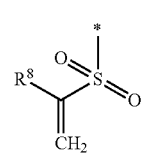

Chemical Formula 9

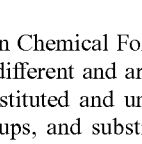

In Chemical Formulae 2 to 9, $R^1$ to $R^8$ may be the same or different and are independently selected from hydrogen, substituted and unsubstituted C1 to C10 aliphatic organic groups, and substituted and unsubstituted C6 to C20 aromatic organic groups.

The additive may include a compound selected from compounds represented by the following Chemical Formula 10, compounds represented by the following Chemical Formula 11, derivatives thereof, and combinations thereof.

Chemical Formula 10

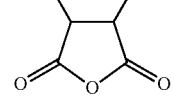

Chemical Formula 11

In Chemical Formulae 10 and 11, $R^9$ to $R^{12}$ may be the same or different and are independently selected from hydrogen, halogens, substituted and unsubstituted C1 to C10 alkyl groups, substituted and unsubstituted C1 to C10 alkoxy groups, and substituted and unsubstituted C2 to C10 alkenyl groups.

The "L" of Chemical Formula 1 may include a repeating unit selected from repeating units represented by the following Chemical Formulae 12 to 14, and combinations thereof.

Chemical Formula 12

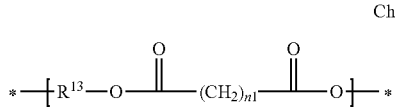

Chemical Formula 13

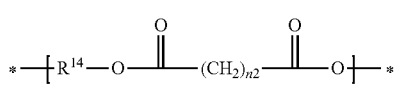

Chemical Formula 14

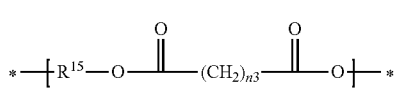

In Chemical Formulae 12 to 14, $R^{13}$ to $R^{15}$ may be the same or different and each is a residual group derived from a compound selected from ethylene glycol, polyethylene glycol, propylene glycol, polypropylene glycol, diethylene glycol, alkanediol, ethoxylated alkanediol, propoxylated alkanediol, trimethylol propane, ethoxylated trimethylol propane, propoxylated trimethylol propane, ditrimethylol propane, ethoxylated ditrimethylol propane, propoxylated ditrimethylol propane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A. Also, in Chemical Formulae 12-14, $n_1$ to $n_3$ may be the same or different and each is an integer ranging from 1 to 20.

The gel electrolyte for a rechargeable lithium battery may include the additive in an amount of about 0.1 wt % by weight to about 10 wt % based on the total weight of the gel electrolyte. In some embodiments, for example, the gel electrolyte includes the additive in an amount of about 0.5 wt % to about 2 wt % based on the total weight of the gel electrolyte.

In the gel electrolyte for a rechargeable lithium battery, the gel polymer may further include a repeating unit derived from a second monomer selected from compounds represented by the following Chemical Formulae 15 to 22 and combinations thereof.

Chemical Formula 15

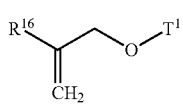

Chemical Formula 16

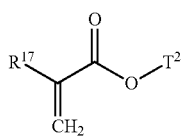

Chemical Formula 17

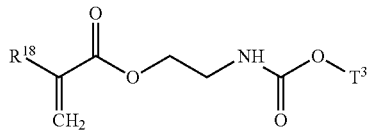

Chemical Formula 18

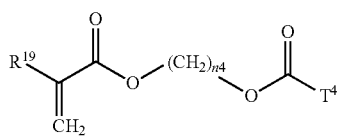

Chemical Formula 19

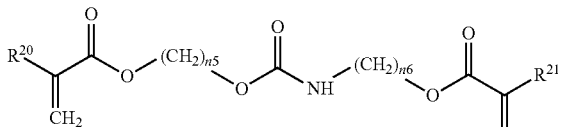

Chemical Formula 20

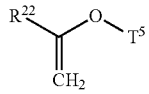

Chemical Formula 21

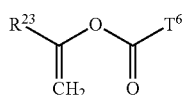

Chemical Formula 22

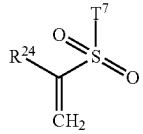

In Chemical Formulae 15 to 22, $R^{16}$ to $R^{24}$ may be the same or different and are independently selected from hydrogen, substituted and unsubstituted C1 to C10 aliphatic organic groups, and substituted and unsubstituted C6 to C20 aromatic organic groups. $T^1$ to $T^7$ may be the same or different and are independently selected from hydrogen, substituted and unsubstituted C1 to C20 aliphatic organic groups, and substituted and unsubstituted C6 to C30 aromatic organic groups. Also, in Chemical Formulae 15 to 22, $n_4$ to $n_6$ may be the same or different and each is an integer ranging from 1 to 10.

When the gel polymer includes a repeating unit derived from the first monomer and a repeating unit derived from the second monomer, the repeating unit derived from the first monomer and the repeating unit derived the second monomer may be included in a weight ratio of about 85:15 to about 50:50.

In the gel electrolyte for a rechargeable lithium battery, the non-aqueous organic solvent may include gamma-butyrolactone (γ-butyrolactone, GBL). In this case, the gamma-butyrolactone may be included in an amount of about 5 wt % to about 60 wt % based on the total weight of the non-aqueous organic solvent including the gamma-butyrolactone.

The gel electrolyte for a rechargeable lithium battery may have viscosity of about 4 cp to about 20 cp.

According to other embodiments, a rechargeable lithium battery includes a positive electrode including a positive active material, a negative electrode including a negative active material, and the gel electrolyte.

The gel electrolyte for a rechargeable lithium battery including an additive according to embodiments of this disclosure may improve the capacity and cycle-life characteristics of the rechargeable lithium battery including reducing the non-charging area of an electrode plate.

BRIEF DESCRIPTION OF THE DRAWING

FIG. 1 is a cross-sectional perspective view of a rechargeable lithium battery according to one embodiment.

DETAILED DESCRIPTION

This disclosure describes certain exemplary embodiments, but is not limited thereto.

As used herein, unless otherwise defined, the term "substituted" indicates that at least one hydrogen of the identified group is substituted with at least one functional group selected from halogens (e.g., F, Br, Cl or I), hydroxyl groups, nitro groups, cyano groups, amino groups (e.g., $NH_2$, $NH(R^{100})$, or $N(R^{101})(R^{102})$, where $R^{100}$, $R^{101}$, and $R^{102}$ may be the same or different and are independently selected from C1 to C10 alkyl groups), amidino groups, hydrazine groups, hydrazone groups, carboxyl groups, substituted and unsubstituted alkyl groups, substituted and unsubstituted alkoxy groups, substituted and unsubstituted alicyclic organic groups, substituted and unsubstituted aryl groups, substituted and unsubstituted alkenyl groups, substituted and unsubstituted alkynyl groups, substituted and unsubstituted heteroaryl groups, and substituted and unsubstituted heterocycloalkyl groups.

As used herein, unless otherwise provided, the terms "heteroaryl group," "heterocycloalkyl group," and "heteroarylene group" independently refer to an aryl group, cycloalkyl group, or arylenegroup including 1 to 3 heteroatoms selected from N, O, S, Si, or P in one ring, with the remaining atoms of the ring being carbon.

As used herein, unless otherwise provided, the term "alkyl group" refers to a C1 to C30 alkyl group (for example, a C1 to C15 alkyl group), the term "cycloalkyl group" refers to a C3 to C30 cycloalkyl group (for example, a C3 to C15 cycloalkyl group), and the term "aryl group" refers to a C6 to C30 aryl group (for example, a C6 to C18 aryl group).

As used herein, unless otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group (for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group), the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group (for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group), and the term "aromatic organic group" refers to a C6 to C30 aryl group, a C2 to C30 heteroaryl group, a C6 to C30 arylene group, or a C2 to C30 heteroarylene group (for example, a C6 to C16 aryl group, a C2 to C16 heteroaryl group, a C6 to C16 arylene group, or a C2 to C16 heteroarylene group).

As used herein, unless otherwise provided, "combination" refers to a mixture or a copolymerization. Unless otherwise provided, "copolymerization" refers to block copolymerization, random copolymerization, alternative copolymerization, graft copolymerization, or the like, and "copolymer" refers to a block copolymer, a random copolymer, an alternative copolymer, a graft copolymer, or the like.

In the present specification, unless otherwise provided, "*" refers to a connection point at which the same or different atom or chemical moiety is linked to the identified compound or moiety.

According to one embodiment, a gel electrolyte for a rechargeable lithium battery includes a gel polymer, a non-aqueous organic solvent, a lithium salt, and an additive.

The gel polymer may be a polymer including a repeating unit derived from a first monomer represented by the following Chemical Formula 1.

A-L-E            Chemical Formula 1

In Chemical Formula 1, L may be a residual group of polyester polyol. The polyester polyol is produced through a condensation reaction of at least one alcohol derivative including at least two OH groups at a terminal end (for example, 2 to 6 OH groups), and at least one dicarboxylic acid derivative. The polyester polyol has a weight average molecular weight of about 100 to about 10,000,000.

A and E may be the same or different and are independently selected from compounds represented by the following Chemical Formulae 2 to 9.

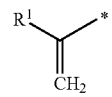

Chemical Formula 2

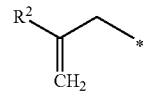

Chemical Formula 3

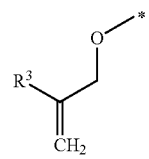

Chemical Formula 4

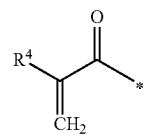

Chemical Formula 5

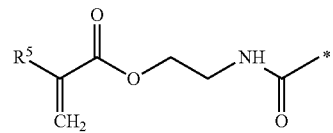

Chemical Formula 6

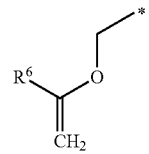

Chemical Formula 7

-continued

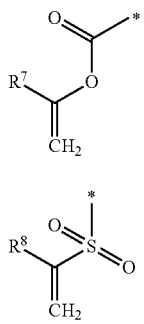

Chemical Formula 8

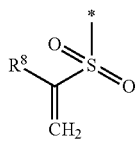

Chemical Formula 9

In Chemical Formulae 2 to 9, $R^1$ to $R^8$ may be the same or different and are independently selected from hydrogen, substituted and unsubstituted C1 to C10 aliphatic organic groups, and substituted and unsubstituted C6 to C20 aromatic organic groups.

In Chemical Formula 1, nonlimiting examples of the alcohol derivative (used in the condensation reaction to provide the polyester polyol) include ethylene glycol, polyethylene glycol, propylene glycol, polypropylene glycol, alkanediol, ethoxylated alkanediol, propoxylated alkanediol, trimethylol propane, ethoxylated trimethylol propane, propoxylated trimethylol propane, ditrimethylol propane, ethoxylated ditrimethylol propane, propoxylated ditrimethylol propane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A. Nonlimiting examples of the dicarboxylic acid derivative (used in the condensation reaction to provide the polyester polyol) include succinic acid, glutaric acid, adipic acid, suberic acid, azelaic acid, sebacic acid, decanedicarboxylic acid, maleic acid, fumaric acid, phthalic acid, isophthalic acid, and terephthalic acid.

The "L" of Chemical Formula 1 may include a repeating unit selected from repeating units represented by the following Chemical Formulae 12 to 14, and combinations thereof.

Chemical Formula 12

Chemical Formula 13

Chemical Formula 14

In Chemical Formulae 12 to 14, $R^{13}$ to $R^{15}$ are residual groups derived from an alcohol derivative used to prepare polyester polyol. $R^{13}$ to $R^{15}$ may be the same or different and are residual groups derived from compounds independently selected from ethylene glycol, polyethylene glycol, propylene glycol, polypropylene glycol, diethylene glycol, alkanediol, ethoxylated alkanediol, propoxylated alkanediol, trimethylol propane, ethoxylated trimethylol propane, propoxylated trimethylol propane, ditrimethylol propane, ethoxylated ditrimethylol propane, propoxylated ditrimethylol propane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A. In Chemical Formulae 12 to 1 4, $n_1$ to $n_3$ may be the same or different and each is an integer ranging from 1 to 20.

As the gel polymer includes the repeating unit derived from the first monomer, the battery including the gel polymer may have improved mechanical strength.

The first monomer may have a number average molecular weight (Mn) ranging from about 6000 to about 8000, and a weight average molecular weight (Mw) ranging from about 16,000 to about 19,000. When the number average molecular weight and weight average molecular weight of the first monomer fall in the above ranges, the mechanical strength of the battery including the first monomer may be effectively improved.

In the gel electrolyte for a rechargeable lithium battery, the gel polymer may further include a repeating unit derived from a second monomer selected from compounds represented by the following Chemical Formulae 15 to 22, and combinations thereof.

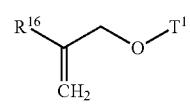

Chemical Formula 15

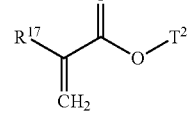

Chemical Formula 16

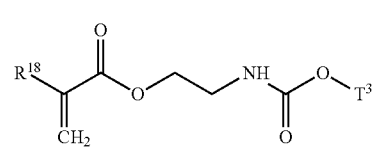

Chemical Formula 17

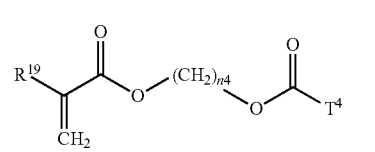

Chemical Formula 18

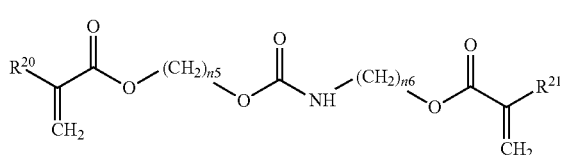

Chemical Formula 19

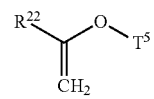

Chemical Formula 20

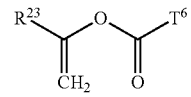

Chemical Formula 21

Chemical Formula 22

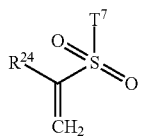

In Chemical Formulae 15 to 22, $R^{16}$ to $R^{24}$ may be the same or different and are independently selected from hydrogen, substituted and unsubstituted C1 to C10 aliphatic organic groups, and substituted and unsubstituted C6 to C20 aromatic organic groups. $T^1$ to $T^7$ may be the same or different and are independently selected from hydrogen, substituted and unsubstituted C1 to C20 aliphatic organic groups, and substituted and unsubstituted C6 to C30 aromatic organic groups. Also, $n_4$ to $n_6$ may be the same or different and each is an integer ranging from 1 to 10.

As the gel polymer includes the repeating unit derived from the first monomer and the repeating unit derived from the second monomer, the polymer gel may be formed to have a uniform size.

When the gel polymer includes the repeating unit derived from the first monomer and the repeating unit derived from the second monomer, the repeating unit derived from the first monomer and the repeating unit derived from the second monomer may be included in a weight ratio ranging from about 85:15 to about 50:50. When the composition ratio of the repeating unit derived from the first monomer and the repeating unit derived the second monomer falls within this range, the strength of the rechargeable lithium battery including them may be improved, and a polymer gel of uniform size may be effectively formed. According to some embodiments, the repeating unit derived from the first monomer and the repeating unit derived from the second monomer may be included in a weight ratio ranging from about 75:25 to about 60:40.

According to some embodiments, a gel electrolyte for a rechargeable lithium battery includes an additive. The additive may include a compound selected from compounds represented by the following Chemical Formula 10, compounds represented by the following Chemical Formula 11, derivatives thereof, and combinations thereof.

Chemical Formula 10

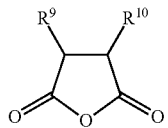

Chemical Formula 11

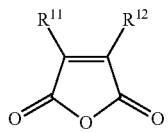

In Chemical Formulae 10 and 11, $R^9$ to $R^{12}$ may be the same or different and are independently selected from hydrogen, halogens, substituted and unsubstituted C1 to C10 alkyl groups, substituted and unsubstituted C1 to C10 alkoxy groups, and substituted and unsubstituted C2 to C10 alkenyl groups.

The additive may have a surface activity effect and thus it may uniformly disperse a monomer as a whole.

Also, the gel electrolyte for a rechargeable lithium battery including the additive along with the gel polymer may improve an ability to immerse electrolyte into an electrode and thus reduces the non-charging region. The rechargeable lithium battery including the gel electrolyte for a rechargeable lithium battery may have excellent capacity characteristics. The effects may be obtained from the use of the additive in the gel electrolyte, but are not obtained from the use of the additive in a liquid electrolyte solution, since the additive cannot effectively suppress the gas generation from the electrode that results in the occurrence of the non-charging region in the rechargeable lithium battery with the liquid electrolyte solution. Accordingly, when the additive is used in the liquid electrolyte, the effect of reducing the non-charging region cannot be obtained. Also, the rechargeable lithium battery including the gel electrolyte for a rechargeable lithium battery may have excellent cycle-life characteristics. Furthermore, the improvements in the initial charging efficiency are not significant in the rechargeable lithium battery including the liquid electrolyte solution with the additive, but are quite significant in that including the gel electrolyte with the additive.

The gel electrolyte for a rechargeable lithium battery may include the additive in a content of about 0.1 wt % to about 10 wt % based on the total weight of the gel electrolyte. When the content of the additive falls within this range, the non-charging region of the electrode may be effectively reduced, and the capacity and cycle-life characteristics of the rechargeable lithium battery including the additive may be effectively improved. According to one embodiment, the additive may be included in a content of about 0.5 wt % to about 2 wt % based on the total weight of the gel electrolyte.

The non-aqueous organic solvent and a lithium salt in the gel electrolyte for a rechargeable lithium battery according to one embodiment include any of those that are generally used in liquid electrolyte solutions.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC); and the like. Nonlimiting examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and the like. Nonlimiting examples of the ether-based solvent include dibutyl ether, tetraglyme, diglyme, dimethoxyethane, 2-methyltetrahydrofuran, tetrahydrofuran, and the like. Nonlimiting examples of the ketone-based solvent include cyclohexanone and the like. Nonlimiting examples of the alcohol-based solvent include ethyl alcohol, isopropyl alcohol, and the like. Nonlimiting examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

A single non-aqueous organic solvent may be used, or a mixture of non-aqueous organic solvents may be used.

When the organic solvent is a mixture, the mixture ratio can be controlled in accordance with the desired battery performance.

The gel electrolyte for a rechargeable lithium battery according to one embodiment of this disclosure may include gamma-butyrolactone.

The gel electrolyte for a rechargeable lithium battery according to one embodiment of this disclosure may include gamma-butyrolactone in an amount of about 5 wt % to about 60 wt % based on the total weight of the non-aqueous organic solvent including the gamma-butyrolactone.

The carbonate-based solvent may include a mixture of a cyclic carbonate and a chain carbonate. The cyclic carbonate and the chain carbonate may be mixed together in a volume ratio of about 1:1 to about 1:9. When the mixture is used for an electrolyte, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in a volume ratio of about 1:1 to about 30:1.

The aromatic hydrocarbon-based organic solvent may be represented by the following Chemical Formula 23.

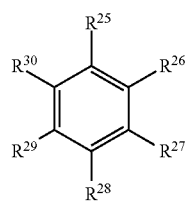

Chemical Formula 23

In Chemical Formula 23, $R^{25}$ to $R^{30}$ may be the same or different and are independently selected from hydrogen, halogens, C1 to C10 alkyl groups, C1 to C10 haloalkyl groups, and combinations thereof.

Nonlimiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

In order to increase the cycle-life of the rechargeable lithium battery, the non-aqueous organic solvent may further include a compound selected from vinylene carbonate, ethylene carbonate-based compounds represented by the following Chemical Formula 24, or a combination thereof.

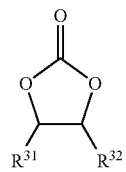

Chemical Formula 24

In Chemical Formula 24, $R^{31}$ and $R^{32}$ may be the same or different and are independently selected from hydrogen, halogens, cyano groups (CN), nitro groups ($NO_2$), and C1 to C5 haloalkyl groups (in some embodiments, for example, C1 to C5 fluoroalkyl groups), provided that at least one of $R^{31}$ and $R^{32}$ is selected from halogens, cyano groups (CN), nitro groups ($NO_2$), and C1 to C5 haloalkyl groups (in some embodiments, for example, C1 to C5 fluoroalkyl groups). That is, both $R^{31}$ and $R^{32}$ are not hydrogen.

Nonlimiting examples of the ethylene carbonate-based compound include fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and the like. The amount of the additive for improving cycle life may be adjusted within an appropriate range.

The lithium salt supplies lithium ions in the battery, enables the basic operation of the rechargeable lithium battery, and improves lithium ion transport between the positive and negative electrodes. Nonlimiting examples of the lithium salt include supporting salts such as $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2-C_4)_2$ (lithium bisoxalato borate, LiBOB), and combinations thereof. The lithium salt may be used in a concentration ranging from about 0.1 M to about 2.0 M. In one embodiment, for example, the lithium salt may be used in a concentration ranging from about 0.5 M to about 2.0M. When the lithium salt is included within the above concentration ranges, electrolyte performance and lithium ion mobility may be enhanced due to optimal electrolyte conductivity and viscosity.

The gel electrolyte for a rechargeable lithium battery according to one embodiment of this disclosure is prepared by polymerizing the first monomer or the first monomer and the second monomer. Herein, a polymerization reaction may be implemented using a polymerization initiator. In other words, an electrolyte composition including the first monomer (or the first monomer and the second monomer), a polymerization initiator, a non-aqueous organic solvent, and a lithium salt is polymerized to thereby prepare a gel electrolyte for a rechargeable lithium battery according to one embodiment of this disclosure.

As for the polymerization initiator, any material that initiates polymerization of monomers while not deteriorating battery performance may be used. Nonlimiting examples of the polymerization initiator include organic peroxides, azo-based compounds, and mixtures of two or more organic peroxides and/or azo-based compounds.

Nonlimiting examples of the organic peroxide include peroxy dicarbonate-based compounds (such as di(4-t-butyl-cyclohexyl)peroxy dicarbonate, di-2-ethylhexyl peroxy carbonate, di-isopropyl peroxy dicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, diethylene glycol-bis(t-butyl peroxy carbonate), and the like); diacyl peroxide compounds (such as diacetyl peroxide, dibenzoyl peroxide, dilauroyl peroxide, bis-3,5,5-trimethyl hexanoyl peroxide, and the like); peroxy ester compounds (such as perhexyl pivalate, t-butyl peroxypivalate, t-amyl peroxypivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecarbonate, 1,1,3,3-tetramethyl butyl 2-ethylhexanoate, t-amyl peroxy 2-ethyl hexanoate, t-butyl peroxy isobutyrate, t-amylperoxy 3,5,5-trimethyl hexanoate, t-butyl peroxy 3,5,5-trimethyl hexanoate, t-butyl peroxy acetate, t-butyl peroxy benzoate, di-butylperoxy trimethyl adipate, and the like. Nonlimiting examples of the azo-based compound include 2,2'-azo-bis(isobutyronitrile), 2,2'-azo-bis(2,4-dimethylvaleronitrile) and 1,1'-azo-bis(cyanocyclo-hexane).

The amount of the polymerization initiator in the polymerization reaction is any amount that may cause the polymerization reaction of the monomers. Generally, the amount of the polymerization initiator ranges from about 50 ppm to about 1000 ppm based on the total weight of the first monomer (or the first monomer and the second monomer), the lithium salt, and the non-aqueous organic solvent. In some embodiments, for example, the amount of the polymerization initiator may range from about 200 ppm to about 400 ppm based on the total weight of the first monomer (or the first monomer and the second monomer), the lithium salt, and the non-aqueous organic solvent. When the amount of the polymerization initiator falls in these ranges, the polymerization initiator does not remain as a byproduct in the prepared electrolyte. Thus, gases produced from remaining polymerization initiator may not be generated. For example, when the polymerization initiator is a peroxide-based compound, $CO_2$ gas may be generated, or when the polymerization initiator is an azo-based compound, $N_2$ gas may be generated. Also, a gel electrolyte for a rechargeable lithium battery having an appropriate polymerization degree may be provided.

The rechargeable lithium battery using the electrolyte composition may be manufactured by inserting an electrode assembly (fabricated by a conventional process and including a positive electrode, a separator, and a negative electrode) into a battery case, injecting the electrolyte composition into the battery case, and curing the electrolyte composition in the battery case. Since the polymerization reaction of the first monomer (or the first monomer and the second monomer) is initiated by the polymerization initiator included in the electrolyte composition during the curing process to thereby form a gel polymer, the final battery does not include a gel electrolyte existing in the form of a polymer. The battery case may have various shapes such as cylinders, prisms, coin-type shapes, and pouch-type shapes.

The gel electrolyte for a rechargeable lithium battery may have a viscosity of about 4 cp to about 20 cp. When the gel electrolyte for a rechargeable lithium battery has a viscosity falling within this range, the mechanical strength of the rechargeable lithium battery may be improved.

According to another embodiment of this disclosure, a rechargeable lithium battery includes a positive electrode including a positive active material, a negative electrode including a negative active material, and the gel electrolyte.

The positive electrode includes a positive active material layer and a current collector supporting the positive active material layer, and the positive active material layer includes a positive active material.

The positive active material may include a lithiated intercalation compound that reversibly intercalates and deintercalates lithium ions. The positive active material may include a composite oxide of at least one selected from cobalt, manganese, and nickel, as well as lithium. In particular, compounds of the following formulae may be used, but the positive active material is not limited thereto.

$Li_aA_{1-b}X_bD_2$ (0.90≤a≤1.8 and 0≤b 0.5)
$Li_aA_{1-b}X_bO_{2-c}D_c$ (0.90≤a≤1.8, 0≤b≤0.5, and 0≤c≤0.05)
$Li_aE_{2-b}X_bO_{4-c}D_c$ (0.90≤a≤1.8, 0≤b≤0.5 and 0≤c≤0.05)
$Li_aNi_{1-b-c}Co_bX_cD_\alpha$ (0.90≤a≤1.8, 0≤b≤0.5, 0≤c≤0.05, and 0≤α≤2)
$Li_aNi_{1-b-c}Co_bX_cO_{2-\alpha}T_\alpha$ (0.90≤a≤1.8, 0≤b≤0.5, 0≤c≤0.05, and 0≤α≤2)
$Li_aNi_{1-b-c}Co_bX_cO_{2-\alpha}T_2$ (0.90≤a≤1.8, 0≤b≤0.5, 0≤c≤0.05, and 0≤α≤2)
$Li_aNi_{1-b-c}Mn_bX_cD_\alpha$ (0.90≤a≤1.8, 0≤b≤0.5, 0≤c≤0.05, and 0≤α≤2)
$Li_aNi_{1-b-c}Mn_bX_cO_{2-\alpha}T_\alpha$ (0.90≤a≤1.8, 0≤b≤0.5, 0≤c≤0.05, and 0≤α≤2)
$Li_aNi_{1-b-c}Mn_bX_cO_{2-\alpha}T_2$ (0.90≤a≤1.8, 0≤b≤0.5, 0≤c≤0.05, and 0≤α≤2)
$Li_aNi_bE_cG_dO_2$ (0.90≤a≤1.8, 0≤b≤0.9, 0≤c≤0.5, and 0.001≤d≤0.1)
$Li_aNi_bCo_cMn_dG_eO_2$ (0.90≤a≤1.8, 0≤b≤0.9, 0≤c≤0.5, 0≤d≤0.5, and 0.001≤e≤0.1)
$Li_aNiG_bO_2$ (0.90≤a≤1.8 and 0.001≤b≤0.1)
$Li_aCoG_bO_2$ (0.90≤a≤1.8 and 0.001≤b≤0.1)
$Li_aMnG_bO_2$ (0.90≤a≤1.8 and 0.001≤b≤0.1)
$Li_aMn_2G_bO_4$ (0.90≤a≤1.8 and 0.001≤b≤0.1)
$QO_2$
$QS_2$
$LiQS_2$
$V_2O_5$
$LiV_2O_5$
$LiZO_2$
$LiNiVO_4$
$Li_{(3-f)}J_2(PO_4)_3$ (0≤f≤2)
$Li_{(3-f)}Fe_2(PO_4)_3$ (0≤f≤2)
$LiFePO_4$.

In the above formulae, A may be selected from Ni, Co, Mn, and combinations thereof; X may be selected from Al, Ni, Co, Mn, Cr, Fe, Mg, Sr, V, rare earth elements, and combinations thereof; D may be selected from O, F, S, P, and combinations thereof; E may be selected from Co, Mn, and combinations thereof; T may be selected from F, S, P, and combinations thereof; G may be selected from Al, Cr, Mn, Fe, Mg, La, Ce, Sr, V, and combinations thereof; Q may be selected from Ti, Mo, Mn, and combinations thereof; Z may be selected from Cr, V, Fe, Sc, Y, and combinations thereof; and J may be selected from V, Cr, Mn, Co, Ni, Cu, and combinations thereof.

In one embodiment, the positive active material may be $Li_aCo_{1-b}X_bO_{2-c}D_c$ (0.90≤a≤1.8, 0≤b≤0.5, and 0≤c≤0.05, X may be selected from Al, Ni, Co, Mn, Cr, Fe, Mg, Sr, V, rare earth, and combinations thereof). When the positive active material is $Li_aCo_{1-b}X_bO_{2-c}D_c$, a rechargeable lithium battery including the electrolyte additive has improved capacity and cycle-life characteristics.

The positive active material compound may have a coating layer on its surface, or may be mixed with another compound having a coating layer. The coating layer may include at least one coating element compound selected from oxides of a coating element, hydroxides of a coating element, oxyhydroxides of a coating element, oxycarbonates of a coating element, and hydroxylcarbonates of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any method that does not adversely influence the properties of the positive active material by including the elements in the compound. For example, the method may include any coating method such as spray coating, dipping, and the like.

The positive active material layer may also include a binder and a conductive material.

The binder improves the binding properties of the positive active material particles to one another, and also with the current collector. Nonlimiting examples of the binder include polyvinyl alcohol, carboxymethyl cellulose, hydroxypropyl cellulose, diacetyl cellulose, polyvinyl chloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material is included to improve electrode conductivity. Any electrically conductive material may be used as a conductive material so long as it does not cause a chemical change. Nonlimiting examples of the conductive material include carbon-based materials such as natural graphite, artificial graphite, carbon black, acetylene black, ketjen black, carbon fiber, and the like; metal-based materials including metal powders or metal fibers of copper, nickel, aluminum, silver, or the like; one or more conductive polymers such as polyphenylene derivatives; and mixtures thereof.

The current collector may be aluminum (Al), but is not limited thereto.

The negative electrode includes a current collector and a negative active material layer formed on the current collector, and the negative active material layer includes a negative active material.

Nonlimiting examples of the negative active material include materials that reversibly intercalate/deintercalate lithium cations, lithium metal, lithium metal alloys, materials capable of doping and dedoping lithium, and transition metal oxides.

The material that reversibly intercalates/deintercalates lithium cations may be a carbonaceous material, and any carbonaceous negative active material generally used in lithium cation rechargeable batteries may be used, such as crystalline carbon, amorphous carbon, and combinations thereof. The crystalline carbon may be shapeless, or may be sheet-shaped, flake-shaped, spherical, or fibrous-shaped natural or artificial graphite. The amorphous carbon may be soft carbon, hard carbon, mesophase pitch carbide, fired coke, or the like.

Nonlimiting examples of the lithium metal alloy include alloys of lithium and at lease one metal selected from Na, K, Rb, Cs, Fr, Be, Mg, Ca, Sr, Si, Sb, Pb, In, Zn, Ba, Ra, Ge, Al, and Sn.

The material capable of doping and dedoping lithium may include Si, $SiO_x$ ($0<x<2$), Si—Y alloys (where Y is an element selected from alkaline metals, alkaline-earth metals, group 13 elements, group 14 elements, transition metals, rare earth elements, and combinations thereof, but is not Si), Sn, $SnO_2$, Sn—Y alloys (where Y is an element selected from alkaline metals, alkaline-earth metals, group 13 elements, group 14 elements, transition metals, rare earth elements, and combinations thereof, but is not Sn), and the like. At least one of these materials may be mixed with $SiO_2$. In addition, carbon may further be deposited on the surface of the material capable of doping lithium. Coating the surface of the above materials with carbon may be performed by decomposing organic materials (such as ethylene, tetrahydrofuran (THF), and cyclohexanone) at a high temperature (for example, 800° C. or higher) under vacuum in the presence of the above materials, but is not limited thereto. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The transition metal oxide may include vanadium oxide or lithium vanadium oxide.

The negative active material layer may include a binder, and optionally a conductive material.

The binder improves the binding properties of the negative active material particles to one another, and also with the current collector. The binder may include a non-water-soluble binder, a water-soluble binder, or a combination thereof.

Nonlimiting examples of the non-water-soluble binder include polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, polyamideimide, polyimide, and combinations thereof.

Nonlimiting examples of the water-soluble binder include styrene-butadiene rubbers, acrylated styrene-butadiene rubbers, polyvinyl alcohol, sodium polyacrylate, copolymers including propylene and a C2 to C8 olefin, copolymers of (meth)acrylic acid and (meth)acrylic acid alkyl ester, and combinations thereof.

When the water-soluble binder is used as a negative electrode binder, a cellulose-based compound may be further used to provide viscosity. The cellulose-based compound may include one or more of carboxymethyl cellulose, hydroxypropylmethyl cellulose, methyl cellulose, and alkaline metal salts thereof. The alkaline metal may be Na, K, or Li. The cellulose-based compound may be included in an amount of about 0.1 to about 3 parts by weight based on 100 parts by weight of the binder.

The conductive material is included to improve electrode conductivity. Any electrically conductive material may be used as the conductive material so long as it does not cause a chemical change. Nonlimiting examples of the conductive material include carbon-based materials such as natural graphite, artificial graphite, carbon black, Super-P (3M company), acetylene black, ketjen black, hard carbon, soft carbon, carbon fibers, and the like; metal-based materials including metal powders and metal fibers of copper, nickel, aluminum, silver, and the like; conductive polymers such as polyphenylene derivatives; and mixtures thereof.

The current collector may include a copper foil, a nickel foil, a stainless steel foil, a titanium foil, a nickel foam, a copper foam, a polymer substrate coated with a conductive metal, or a combination thereof.

The positive and negative electrodes may be fabricated by mixing the active material and binder (and optionally the conductive material) to provide an active material composition, and coating the composition on a current collector.

As the solvent, any solvent that is generally used for the preparation of an active material composition and that is capable of dispersing the active material, conductive material, and binder may be used. Nonlimiting examples of the solvent include N-methylpyrrolidone and the like. When a water-soluble binder is used in the negative electrode, water may be used as the solvent for preparing the negative active material composition.

The rechargeable lithium battery may further include a separator between the negative electrode and the positive electrode, as needed. Nonlimiting examples of suitable separator materials include polyethylene, polypropylene, polyvinylidene fluoride, and multi-layers thereof (such as a polyethylene/polypropylene double-layered separator, a polyethylene/polypropylene/polyethylene triple-layered separator, and a polypropylene/polyethylene/polypropylene triple-layered separator).

The rechargeable lithium batteries may have a variety of shapes and sizes, and include cylindrical, prismatic, coin-type, or pouch-type batteries, and may be thin film batteries, or may be rather bulky in size. Structures and fabrication methods for lithium ion batteries pertaining to this disclosure are known.

FIG. 1 is a cross-sectional perspective view of a representative structure of a rechargeable lithium battery according to one embodiment. As shown in FIG. 1, the rechargeable lithium battery 1 includes a battery case 5 including a negative electrode 2, a positive electrode 4, and a separator 3 interposed between the positive electrode 4 and the negative electrode 2, an electrolyte (not shown) impregnated therein, and a sealing member 6 sealing the battery case 5. The rechargeable lithium battery may take any shape or form (such as a prisms, cylinders, coin-type shapes, and pouch-type shapes) as long as it includes the electrolyte for a rechargeable lithium battery and operates as a battery.

EXAMPLES

The following examples are provided for illustrative purposes only, and do not limit the scope of this disclosure.

Example 1: Preparation of Gel Electrolyte for a Rechargeable Lithium Battery Cell and Manufacture of Rechargeable Lithium Battery Cell Including the Gel Electrolyte About 5 wt % of a first monomer (having a weight average molecular weight of about 18,000) including a first repeating unit represented by the following Chemical Formula 12a, a second repeating unit represented by the following Chemical Formula 13a, and a third repeating unit represented by the following Chemical Formula 14a, and including a functional group represented by the following Chemical Formula 6a at both terminals, 0.5 wt % of succinic anhydride represented by the following Chemical Formula 10a, and 94.5 wt % 1.3M LiPF$_6$ in a mixed solution of dimethyl carbonate (DMC), ethylmethyl carbonate (EMC) and diethyl carbonate (DEC) (volume ratio=1:1:1) were mixed.

Chemical Formula 12a

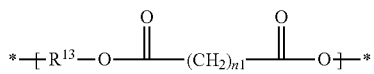

Chemical Formula 13a

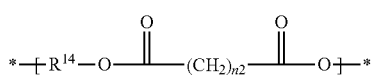

Chemical Formula 14a

In Chemical Formulae 12a, 13a, and 14a, $R^{13}$ is a residual group derived from ethylene glycol, $R^{14}$ is a residual group derived from diethylene glycol, and $R^{15}$ is a residual group derived from trimethylol propane. Also, $n_1$ is 4, $n_2$ is 4, and $n_3$ is 4.

Chemical Formula 6a

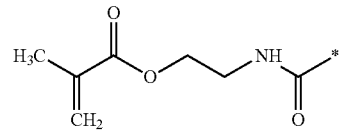

Chemical Formula 10a

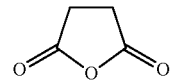

A 2,2'-azobis(isobutyronitrile) azo-based polymerization initiator was added to the obtained solution (referred to as the "pre-gel") in an amount of about 350 ppm based on the weight of the pre-gel and was dissolved in the solution to prepare a gel electrolyte composition.

About 2.7 g of the gel electrolyte composition for a rechargeable lithium battery cell was injected into a battery assembly that included a positive electrode, a negative electrode, and a separator, and aged for about 16 hours. A 553450-prismatic rechargeable lithium battery cell was manufactured by sealing the acquired product under vacuum and heating in an oven set to about 75° C. for about 4 hours. The rechargeable lithium battery cell had a 1 C theoretical capacity (capacity guaranteed during a capacity estimation test, nominal capacity) of about 1150 mAh.

During the heating process, a polymerization reaction occurred so as to prepare a gel electrolyte within the rechargeable lithium battery cell.

The positive electrode was fabricated by preparing a positive active material slurry, coating the positive active material slurry on an aluminum foil current collector, and pressing the resultant. The positive active material slurry was prepared by mixing a LiCoO$_2$ positive active material, an acetylene black conductive material, and a polyvinylidene fluoride binder in a weight ratio of 96:2:2 wt % in an N-methylpyrrolidone solvent.

The negative electrode was fabricated by preparing a negative active material slurry, coating the negative active material slurry on a copper foil current collector, and pressing the resultant. The negative active material slurry was prepared by mixing artificial graphite and a polyvinylidene fluoride binder in a weight ratio of 94:6 wt % in an N-methylpyrrolidone solvent.

Example 2: Preparation of Gel Electrolyte and Manufacture of Rechargeable Lithium Battery Cell A gel electrolyte and a rechargeable lithium battery cell including the gel electrolyte were prepared as in Example 1, except that 1 wt % of succinic anhydride represented by Chemical Formula 10a was used and the amount of 1.3M LiPF$_6$ in a mixed solution of DMC, EMC and DEC was decreased as much as the increased amount of the succinic anhydride.

Example 3: Preparation of Gel Electrolyte and Manufacture of Rechargeable Lithium Battery Cell A gel electrolyte and a rechargeable lithium battery cell including the gel electrolyte were prepared as in Example 1, except that 2 wt % of succinic anhydride represented by Chemical Formula 10a was used and the amount of 1.3M LiPF$_6$ in a mixed solution of DMC, EMC and DEC was decreased as much as the increased amount of the succinic anhydride.

Example 4: Preparation of Gel Electrolyte and Manufacture of Rechargeable Lithium Battery Cell A gel electrolyte and a rechargeable lithium battery cell including the gel electrolyte were prepared as in Example 1, except that 0.1 wt % of succinic anhydride represented by Chemical Formula 10a was used and the amount of 1.3M LiPF$_6$ in a mixed solution of DMC, EMC and DEC was increased as much as the decreased amount of the succinic anhydride.

Example 5: Preparation of Gel Electrolyte and Manufacture of Rechargeable Lithium Battery Cell A gel electrolyte and a rechargeable lithium battery cell including the gel electrolyte were prepared as in Example 1, except that 10 wt % of succinic anhydride represented by Chemical Formula 10a was used and the amount of 1.3M LiPF$_6$ in a mixed solution of DMC, EMC and DEC was decreased as much as the increased amount of the succinic anhydride.

Comparative Example 1: Preparation of Gel Electrolyte and Manufacture of Rechargeable Lithium Battery Cell A gel electrolyte and a rechargeable lithium battery cell including the gel electrolyte were prepared as in Example 1, except that the succinic anhydride represented by Chemical Formula 10a was not used, and the amount of 1.3M LiPF$_6$ in a mixed solution of DMC, EMC and DEC was increased as much as the decreased amount of the succinic anhydride.

Comparative Example 2: Preparation of Liquid Electrolyte and Manufacture of Rechargeable Lithium Battery Cell Including the Liquid Electrolyte An electrolyte solution was prepared by dissolving 1.3 M LiPF$_6$ in a mixed solution of dimethyl carbonate (DMC), ethylmethyl carbonate (EMC), and diethyl carbonate (DEC) (volume ratio=1:1:1).

About 2.7 g of the resulting liquid electrolyte solution was injected into a battery assembly that included a positive electrode, a negative electrode, and a separator, and aged for about 16 hours. A 553450-prismatic rechargeable lithium battery cell was manufactured by sealing the acquired product under vacuum. The 10 theoretical capacity (which is a capacity guaranteed during a capacity estimation test, nominal capacity) of the rechargeable lithium battery cell was 1150 mAh.

As a result of the above process, the rechargeable lithium battery cell including a liquid electrolyte solution for a rechargeable lithium battery cell was manufactured.

The positive electrode was fabricated by preparing a positive active material slurry, coating the positive active material slurry on an aluminum (Al) foil current collector, and pressing the resultant. The positive active material slurry was prepared by mixing a LiCoO$_2$ positive active material, an acetylene black conductive material, and a polyvinylidene fluoride binder in a weight ratio of about 96:2:2 wt % in an N-methylpyrrolidone solvent.

The negative electrode was fabricated by preparing a negative active material slurry, coating the negative active material slurry on a copper (Cu) foil current collector, and pressing the resultant. The negative active material slurry was prepared by mixing artificial graphite and a polyvinylidene fluoride binder in a weight ratio of about 94:6 wt % in an N-methylpyrrolidone solvent.

Comparative Example 3: Preparation of Liquid Electrolyte and Manufacture of Rechargeable Lithium Battery Cell Including the Liquid Electrolyte A rechargeable lithium battery cell including a liquid electrolyte solution was prepared as in Comparative Example 2, except that the liquid electrolyte solution was prepared by adding succinic anhydride represented by Chemical Formula 10a to a 1.3M LiPF$_6$ in a mixed solution of dimethyl carbonate (DMC), ethylmethyl carbonate (EMC), and dimethyl carbonate (DEC) (volume ratio=1:1:1). At this time, the amount of the succinic anhydride was 1 wt % based on the total weight of the liquid electrolyte solution.

Comparative Example 4: Preparation of Gel Electrolyte and Manufacture of Rechargeable Lithium Battery Cell A gel electrolyte and a rechargeable lithium battery cell including the gel electrolyte were prepared as in Example 1, except that 0.09 wt % of succinic anhydride represented by Chemical Formula 10a was used and the amount of 1.3M LiPF$_6$ in a mixed solution of DMC, EMC and DEC was increased as much as the decreased amount of the succinic anhydride.

Comparative Example 5: Preparation of Gel Electrolyte and Manufacture of Rechargeable Lithium Battery Cell A gel electrolyte and a rechargeable lithium battery cell including the gel electrolyte were prepared as in Example 1, except that 11 wt % of succinic anhydride represented by Chemical Formula 10a was used and the amount of 1.3M LiPF$_6$ in a mixed solution of DMC, EMC and DEC was decreased as much as the increased amount of the succinic anhydride.

Experimental Example 1: Measurement of Viscosity of Electrolyte

The viscosities of the electrolytes prepared according to Examples 1 to 3 and Comparative Examples 1 to 3 were measured using a LVDV-II+ Pro viscosity measuring instrument (produced by Coretech company). The measurement results are as shown in the following Table 1.

Experimental Example 2: Measuring the Number and Size of the Non-Charging Regions After the rechargeable lithium battery cells manufactured according to Examples 1 to 3 and Comparative Examples 1 to 3 were charged up to about 4.2V at a charge rate of about 0.5 C, the negative electrodes were taken out of the rechargeable lithium battery cells and the non-charging regions in the negative electrodes were measured with the naked eye, and the diameters of the non-charging regions were measured with a steel ruler. The measurement results are as shown in the following Table 1.

Experimental Example 3: Measurement of Initial Charging Efficiency

The rechargeable lithium battery cells manufactured according to Examples 1 to 5 and Comparative Examples 1 to 5 were charged to about 4.2V at a charge rate of about 0.5 C and discharged to 3.0V at a discharge rate of 0.5 C for one cycle, and then discharge capacities were measured. The discharge capacity refers to an initial formation capacity. An initial charge efficiency was calculated as the initial formation capacity based on 1 C theoretical capacity. The measurement results are as shown in the following Table 2.

Experimental Example 4: Assessment of Cycle-Life Characteristics (Capacity Retention)

The rechargeable lithium battery cells manufactured according to Examples 1 to 5 and Comparative Examples 1 to 5 were charged up to about 4.2V at a charge rate of about 0.5 C, and discharged to about 3.0V at a discharge rate of about 0.5 C for 50 cycles. Capacity retentions were calculated as a ratio of discharge capacity after 50 cycles to discharge capacity after one cycle. The results are as shown in the following Table 2.

TABLE 1

|  | Viscosity of electrolyte (cp) | Number of non-charging regions (number/cm$^2$) | Size of non-charging regions (mm) |
|---|---|---|---|
| Example 1 | 13 | 2 | 3 |
| Example 2 | 13 | 1 | 3 |
| Example 3 | 13 | 1 | 3 |
| Comparative Example 1 | 13 | 5 | 7 |
| Comparative Example 2 | 3 | 5 | 7 |
| Comparative Example 3 | 3 | 4 | 6 |

TABLE 2

|  | Initial charge efficiency (%) | Capacity retention (50$^{th}$ cycle, %) |
|---|---|---|
| Example 1 | 114 | 70 |
| Example 2 | 114 | 90 |
| Example 3 | 113 | 89 |
| Example 4 | 110 | 60 |
| Example 5 | 113 | 88 |
| Comparative Example 1 | 108 | 39 |
| Comparative Example 2 | 107 | 46 |
| Comparative Example 3 | 108 | 65 |
| Comparative Example 4 | 107 | 60 |
| Comparative Example 5 | 112 | 52 |

As shown in Table 1, the rechargeable lithium battery cells of Examples 1 to 3 that used the gel electrolytes including succinic anhydride decreased the non-charging regions in the electrode plate more effectively than the rechargeable lithium battery cell of Comparative Example 1 that used the gel electrolyte not including succinic anhydride.

Also, as shown in Table 2, it may be seen that the rechargeable lithium battery cells of Examples 1 to 5 were superior in initial charge efficiency and capacity retention to the rechargeable lithium battery cells of Comparative Examples 1 to 4. The rechargeable lithium battery cell of Comparative Example 5 was slightly good initial charge efficiency, but extremely poor capacity retention to the rechargeable lithium battery cell of Example 2.

It is also evident from Tables 1 and 2 that the effect of adding succinic anhydride was obtained from the use of the additive in rechargeable lithium battery cells using a gel electrolyte. In particular, as seen in Tables 1 and 2, the battery cells of Comparative Example 2 (including a liquid electrolyte with no succinic anhydride) and Comparative Example 3 (including 1 succinic anhydride) exhibited similar battery performances. As such, the results obtained from Comparative Examples 2 and 3 show that the addition of succinic anhydride to a liquid electrolyte solution does not improve the initial charge efficiency.

While this disclosure been described in connection with certain exemplary embodiment, those of ordinary skill in the art will understand that certain modifications and changes to the described embodiments may be made without departing from the spirit and scope of the disclosure, as described in the appended claims.

What is claimed is:

1. A gel electrolyte for a rechargeable lithium battery, comprising:
a gel polymer comprising a repeating unit derived from a first monomer represented by Chemical Formula 1;
a non-aqueous organic solvent;
a lithium salt; and
an additive comprising succinic anhydride, the additive being present in an amount of about 1 wt % to about 2 wt % based on the total weight of the gel electrolyte:

A-L-E   Chemical Formula 1 wherein, in Chemical Formula 1:
L comprises a repeating unit selected from the group consisting of repeating units represented by Chemical Formulae 12 to 14, and combinations thereof:

Chemical Formula 12

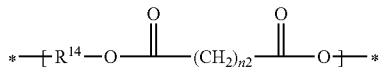

Chemical Formula 13

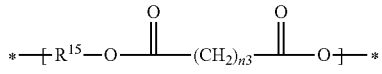

Chemical Formula 14 wherein, in Chemical Formulae 12 to 14:
each of $R^{13}$ to $R^{15}$ is a residual group derived from a compound selected from the group consisting of ethylene glycol, polyethylene glycol, propylene glycol, polypropylene glycol, diethylene glycol, alkanediol, ethoxylated alkanediol, propoxylated alkanediol, trimethylol propane, ethoxylated trimethylol propane, propoxylated trimethylol propane, ditrimethylol propane, ethoxylated ditrimethylol propane, propoxylated ditrimethylol propane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A, and each of $n_1$ to $n_3$ is independently an integer ranging from 1 to 20, and each of A and E is independently selected from the group consisting of moieties represented by Chemical Formulae 2 to 9:

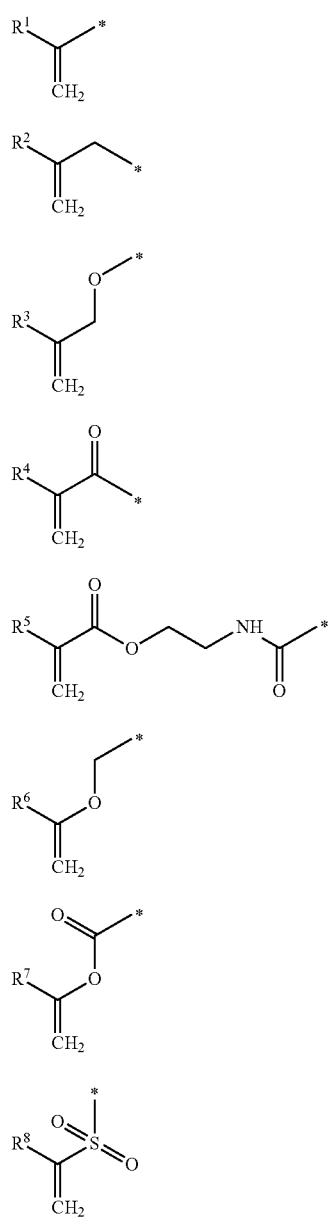

wherein, in Chemical Formulae 2 to 9:
each of $R^1$ to $R^8$ is independently selected from the group consisting of hydrogen, substituted and unsubstituted C1 to C10 aliphatic organic groups, and substituted and unsubstituted C6 to C20 aromatic organic groups, the gel electrolyte having a viscosity of about 4 cp to about 20 cp.

2. The gel electrolyte of claim 1, wherein the gel polymer further comprises a repeating unit derived from a second monomer selected from the group consisting of compounds represented by Chemical Formulae 15 to 22 and combinations thereof:

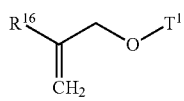

Chemical Formula 15

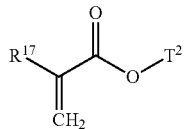

Chemical Formula 16

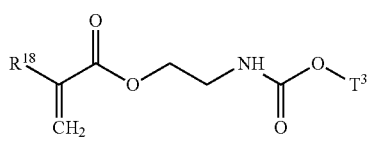

Chemical Formula 17

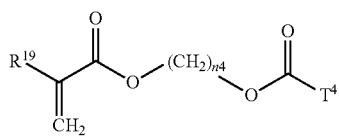

Chemical Formula 18

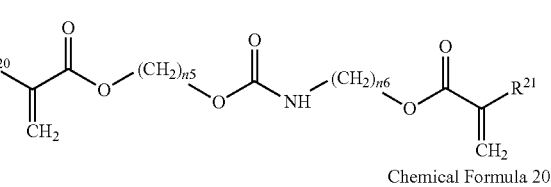

Chemical Formula 19

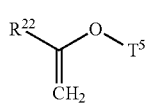

Chemical Formula 20

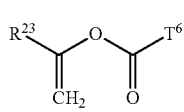

Chemical Formula 21

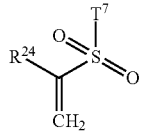

Chemical Formula 22 wherein, in Chemical Formulae 15 to 22:
each of $R^{16}$ to $R^{24}$ is independently selected from the group consisting of hydrogen, substituted and unsubstituted C1 to C10 aliphatic organic groups, and substituted and unsubstituted C6 to C20 aromatic organic groups, each of $T^1$ to $T^7$ is independently selected from the group consisting of hydrogen, substituted and unsubstituted C1 to C20 aliphatic organic groups, and substituted and unsubstituted C6 to C30 aromatic organic groups, and each of $n_4$ to $n_6$ is independently an integer of 1 to 10.

3. The gel electrolyte of claim 2, wherein the gel polymer comprises the repeating unit derived from the first monomer and the repeating unit derived from the second monomer in a weight ratio of about 85:15 to about 50:50.

4. The gel electrolyte of claim 1, wherein the non-aqueous organic solvent comprises gamma-butyrolactone.

5. The gel electrolyte of claim 4, wherein the gamma-butyrolactone is present in an amount of about 5 wt % to about 60 wt % based on the total weight of the non-aqueous organic solvent containing the gamma-butyrolactone.

6. A rechargeable lithium battery, comprising:
a positive electrode including a positive active material;
a negative electrode including a negative active material; and
a gel electrolyte comprising:
a gel polymer comprising a repeating unit derived from a first monomer represented by Chemical Formula 1,
a non-aqueous organic solvent,
a lithium salt, and
an additive comprising succinic anhydride, the additive being present in an amount of about 1 wt % to about 2 wt % based on the total weight of the gel electrolyte:

A-L-E   Chemical Formula 1 wherein, in Chemical Formula 1:
L comprises a repeating unit selected from the group consisting of repeating units represented by Chemical Formulae 12 to 14, and combinations thereof:

Chemical Formula 12

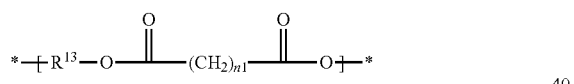

Chemical Formula 13

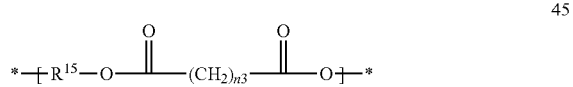

Chemical Formula 14

*─(R¹⁵─O─C(=O)─(CH₂)ₙ₃─C(=O)─O)─* wherein, in Chemical Formulae 12 to 14:
each of $R^{13}$ to $R^{15}$ is a residual group derived from a compound selected from the group consisting of ethylene glycol, polyethylene glycol, propylene glycol, polypropylene glycol, diethylene glycol, alkanediol, ethoxylated alkanediol, propoxylated alkanediol, trimethylol propane, ethoxylated trimethylol propane, propoxylated trimethylol propane, ditrimethylol propane, ethoxylated ditrimethylol propane, propoxylated ditrimethylol propane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A, and each of $n_1$ to $n_3$ is independently an integer ranging from 1 to 20, and each of A and E is independently selected from the group consisting of moieties represented by Chemical Formulae 2 to 9:

Chemical Formula 2

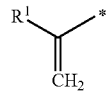

Chemical Formula 3

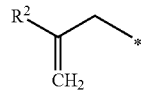

Chemical Formula 4

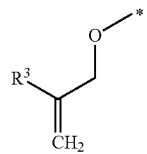

Chemical Formula 5

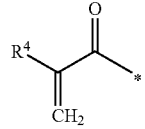

Chemical Formula 6

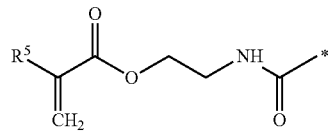

Chemical Formula 7

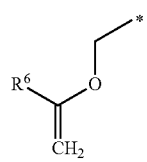

Chemical Formula 8

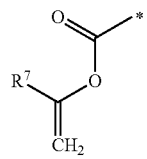

Chemical Formula 9

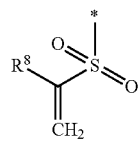

wherein, in Chemical Formulae 2 to 9:
each of $R^1$ to $R^8$ is independently selected from the group consisting of hydrogen, substituted and unsubstituted C1 to C10 aliphatic organic groups, and substituted and unsubstituted C6 to C20 aromatic organic groups, the gel electrolyte having a viscosity of about 4 cp to about 20 cp.

7. The rechargeable lithium battery of claim 6, wherein the gel polymer further comprises a repeating unit derived from a second monomer selected from the group consisting of compounds represented by Chemical Formulae 15 to 22 and combinations thereof:

Chemical Formula 15

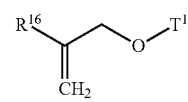

Chemical Formula 16

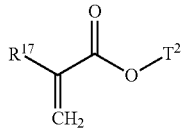

Chemical Formula 17

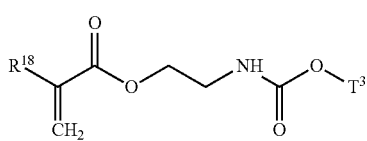

Chemical Formula 18

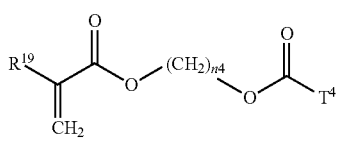

Chemical Formula 19

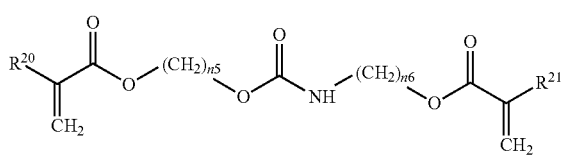

Chemical Formula 20

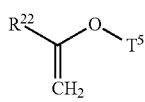

Chemical Formula 21

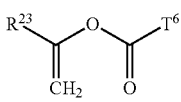

Chemical Formula 22

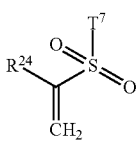

wherein, in Chemical Formulae 15 to 22:

each of $R^{16}$ to $R^{24}$ is independently selected from the group consisting of hydrogen, substituted and unsubstituted C1 to C10 aliphatic organic groups, and substituted and unsubstituted C6 to C20 aromatic organic groups, each of $T^1$ to $T^7$ is independently selected from the group consisting of hydrogen, substituted and unsubstituted C1 to C20 aliphatic organic groups, and substituted and unsubstituted C6 to C30 aromatic organic groups, and each of $n_4$ to $n_6$ is independently an integer of 1 to 10.

8. The a rechargeable lithium battery of claim 7, wherein the gel polymer comprises the repeating unit derived from the first monomer and the repeating unit derived from the second monomer in a weight ratio of about 85:15 to about 50:50.

9. The rechargeable lithium battery of claim 6, wherein the non-aqueous organic solvent comprises gamma-butyrolactone.

10. The rechargeable lithium battery of claim 9, wherein the gamma-butyrolactone is present in an amount of about 5 wt % to about 60 wt % based on the total weight of the non-aqueous organic solvent containing the gamma-butyrolactone.

\* \* \* \* \*